(12) United States Patent
Krishnan (10) Patent No.: US 12,135,728 B2
(45) Date of Patent: *Nov. 5, 2024

(54) PATTERN SEARCH BOX

(71) Applicant: ImageScan, Inc, Pasadena, CA (US)

(72) Inventor: Basker S. Krishnan, San Marino, CA (US)

(73) Assignee: IMAGESCAN, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,600

(22) Filed: Apr. 4, 2023

(65) Prior Publication Data

US 2023/0244683 A1 Aug. 3, 2023

Related U.S. Application Data

(63) Continuation of application No. 16/828,887, filed on Mar. 24, 2020, now Pat. No. 11,645,295.

(60) Provisional application No. 62/824,142, filed on Mar. 26, 2019.

(51) Int. Cl.
*G06F 16/248* (2019.01)
*G06F 16/93* (2019.01)

(52) U.S. Cl.
CPC ............ *G06F 16/248* (2019.01); *G06F 16/93* (2019.01)

(58) Field of Classification Search
CPC ............................... G06F 16/248; G06F 16/93
See application file for complete search history.

(56) References Cited

U.S. PATENT DOCUMENTS

| | | | |
|---|---|---|---|
| 5,771,378 A | 6/1998 | Holt et al. |
| 5,995,976 A | 11/1999 | Walker et al. |
| 5,995,978 A | 11/1999 | Cullen et al. |
| 6,184,885 B1 | 2/2001 | DeStefano |
| 6,297,824 B1 | 10/2001 | Hearst et al. |
| 6,741,985 B2 | 5/2004 | Green |
| 6,834,276 B1 | 12/2004 | Jensen et al. |
| 7,373,612 B2 | 5/2008 | Risch et al. |
| 7,596,574 B2 | 9/2009 | Sweeney |
| 7,644,373 B2 | 1/2010 | Jing et al. |
| 7,689,933 B1 | 3/2010 | Parsons |
| 7,747,428 B1 | 6/2010 | Karsh et al. |
| 7,870,130 B2 | 1/2011 | Banerjee et al. |
| 8,005,825 B1 | 8/2011 | Ghosh |
| 8,259,124 B2 | 9/2012 | Averett |

(Continued)

OTHER PUBLICATIONS

Word 2010 Features and Benefits.

(Continued)

*Primary Examiner* — Yuk Ting Choi
(74) *Attorney, Agent, or Firm* — ALONZO & ASSOCIATES; Arlyn Alonzo (57) ABSTRACT

Aspects of the disclosure are directed to establishing a pattern search box for searching one or more documents in a database. Accordingly, a method for searching the database for one or more documents with at least one pattern element, the method including dividing a pattern search box into a plurality of sections; inputting the at least one pattern element to one or more of the plurality of sections of the pattern search box; and searching the database for the one or more documents with the at least one pattern element to the one or more of the plurality of sections of the pattern search box to produce a search result.

10 Claims, 3 Drawing Sheets

(56) References Cited

U.S. PATENT DOCUMENTS

| | | | |
|---|---|---|---|
| 8,433,705 B1 | 4/2013 | Dredze et al. | |
| 8,935,290 B2 | 1/2015 | Ippili et al. | |
| 9,092,428 B1 | 7/2015 | Zhang | |
| 9,142,253 B2 | 9/2015 | Ubillos | |
| 9,483,532 B1 | 11/2016 | Zhang | |
| 9,772,999 B2 | 9/2017 | Krishnan et al. | |
| 10,459,984 B2 | 10/2019 | Krishnan et al. | |
| 10,467,273 B2 | 11/2019 | Krishnan et al. | |
| 10,956,475 B2 | 3/2021 | Krishnan et al. | |
| 11,010,432 B2 | 5/2021 | Krishnan et al. | |
| 11,645,295 B2 | 4/2023 | Krishnan et al. | |
| 2003/0167279 A1 | 9/2003 | Smiga et al. | |
| 2003/0195980 A1 | 10/2003 | Geshwind | |
| 2004/0001104 A1 | 1/2004 | Sommerer et al. | |
| 2004/0054967 A1 | 3/2004 | Brandenberger | |
| 2004/0093331 A1 | 5/2004 | Garner et al. | |
| 2004/0095376 A1 | 5/2004 | Graham et al. | |
| 2004/0111409 A1 | 6/2004 | Abe | |
| 2005/0108001 A1 | 5/2005 | Aarskog | |
| 2005/0138056 A1 | 6/2005 | Stefik | |
| 2005/0149576 A1 | 7/2005 | Marmaros et al. | |
| 2005/0182790 A1 | 8/2005 | Gilbert et al. | |
| 2006/0047651 A1 | 3/2006 | Milic-Frayling et al. | |
| 2006/0080292 A1 | 4/2006 | Alanzi | |
| 2006/0133699 A1 | 6/2006 | Widrow et al. | |
| 2006/0174198 A1 | 8/2006 | Brown et al. | |
| 2006/0277167 A1 | 12/2006 | Gross | |
| 2007/0011149 A1 | 1/2007 | Walker | |
| 2007/0061717 A1 | 3/2007 | Cragun | |
| 2007/0083552 A1 | 4/2007 | Allen et al. | |
| 2007/0179945 A1 | 8/2007 | Marston et al. | |
| 2007/0203945 A1 | 8/2007 | Louw | |
| 2007/0233692 A1 | 10/2007 | Lisa et al. | |
| 2008/0005101 A1 | 1/2008 | Chandra | |
| 2008/0010251 A1 | 1/2008 | Fontoura et al. | |
| 2008/0065606 A1* | 3/2008 | Boys | G06F 16/5838 707/706 |
| 2008/0065636 A1 | 3/2008 | Miller et al. | |
| 2008/0097984 A1 | 4/2008 | Candelore | |
| 2008/0098432 A1 | 4/2008 | Hardacker et al. | |
| 2008/0148147 A1 | 6/2008 | Poston et al. | |
| 2008/0204788 A1 | 8/2008 | Kelly et al. | |
| 2008/0263022 A1 | 10/2008 | Kostorizos et al. | |
| 2008/0279474 A1* | 11/2008 | Venable | G06T 5/005 382/275 |
| 2009/0094238 A1 | 4/2009 | Banerjee et al. | |
| 2009/0158181 A1 | 6/2009 | Becerra et al. | |
| 2009/0177618 A1* | 7/2009 | Schneider | G06F 16/93 707/706 |
| 2009/0183115 A1 | 7/2009 | Iwasaki | |
| 2009/0216736 A1 | 8/2009 | Dexter et al. | |
| 2009/0228777 A1 | 9/2009 | Henry et al. | |
| 2009/0287669 A1 | 11/2009 | Bennett | |
| 2009/0313352 A1 | 12/2009 | Dupont | |
| 2010/0246884 A1 | 9/2010 | Chen et al. | |
| 2010/0287150 A1* | 11/2010 | Downum | G06F 16/951 707/706 |
| 2010/0299201 A1 | 11/2010 | Thrasher | |
| 2010/0332515 A1 | 12/2010 | Carraher et al. | |
| 2011/0035383 A1 | 2/2011 | Ghimire | |
| 2011/0035660 A1 | 2/2011 | Lussier et al. | |
| 2011/0119262 A1 | 5/2011 | Dexter et al. | |
| 2011/0246453 A1 | 6/2011 | Krishnan et al. | |
| 2011/0218990 A1 | 9/2011 | Jordahl | |
| 2011/0258049 A1 | 10/2011 | Ramer et al. | |
| 2011/0295879 A1 | 12/2011 | Logis et al. | |
| 2012/0066210 A1 | 3/2012 | Mukerjee et al. | |
| 2012/0078979 A1 | 3/2012 | Ghimire | |
| 2012/0150861 A1 | 6/2012 | Thione | |
| 2012/0204104 A1 | 8/2012 | Walsh | |
| 2012/0226500 A1 | 9/2012 | Balasubramanian et al. | |
| 2013/0041921 A1 | 2/2013 | Cooper et al. | |
| 2013/0103707 A1 | 4/2013 | Krishnan et al. | |
| 2013/0124515 A1 | 5/2013 | Ghimire | |
| 2015/0160806 A1* | 6/2015 | Fey | G06F 16/951 715/748 |
| 2016/0147848 A1 | 5/2016 | Krishnan et al. | |
| 2017/0140063 A1* | 5/2017 | Dey | G06F 16/957 707/706 |
| 2020/0019547 A1 | 1/2020 | Krishnan et al. | |
| 2020/0019572 A1 | 1/2020 | Krishnan et al. | |
| 2020/0311060 A1 | 10/2020 | Krishnan et al. | |

OTHER PUBLICATIONS

Adobe Acrobat 9 Standard Advanced Search Options.
Adobe Acrobat 9 Standard Find Text in a PDF.
Adobe Acrobat 9 Standard Find Text in multiple PDFs.
Adobe Acrobat 9 Standard Search Features Overview.
Thomas Macentee: "Google Books for Genealogy", Sep. 3, 2011, pp. 1-7, XP055188474, retrieved from Internet: URL:http://web.archive.org/web/20110903063944/http://www.archives.com/experts/macentee-thomas/google-books-for-genealogy.html [retrieved May 11, 2015].
Anonymous: "efTwo (F2) Finds Multiple Words & Their Inflections on a page [Chrome]", Aug. 10, 2011, pp. 1-6, XP055407982, retrieved from the Internet : URL:http://web.archive.org/web/20110810224803/https://www.additivetips.com/internet-tips/eftwo-f2-finds-multiple-words-their-inflections-on-a-p.chrome/ [retrieved on Sep. 19, 2017].
CN101770514a, Published Jul. 7, 2010.
CN101216837a, Published Jan. 18, 2008.
Antiqueira et al. "Complex Network Approach to Text Summarization", Published Feb. 15, 2009.
Youguo et al. "The Frame of Cognitive Pattern Recognition", Published Jul. 26, 2007.
Electric Power Group v Alstrom (District Court, California Central District, No. 2:12-cv-06365-JGB (Aug. 1, 2016)).
Intellectual Ventures v Capital One Financial Corp (District Court, Dist of Maryland, No. 8:14-cv-00111-PWG (Mar. 7, 2017)).
Pratt et al., "A Knowledge-Based Approach to Organizing Retrieved Documents" (1999).
Baeza-Yates et al. "Modern Information Retrieval" 1999, ACM Press.

* cited by examiner

PATTERN SEARCH BOX

CLAIM OF PRIORITY UNDER 35 U.S.C. § 119

The present Application for Patent claims priority to U.S. Non-Provisional application Ser. No. 16/828,887 entitled "Pattern Search Box" filed Mar. 24, 2020 which claimed priority to Provisional Application No. 62/824,142 entitled "Pattern Search Box" filed Mar. 26, 2019, and assigned to the assignee hereof and hereby expressly incorporated by reference herein.

TECHNICAL FIELD

This disclosure relates generally to the field of searching database, and, in particular, to establishing a pattern search box for searching one or more documents in a database.

BACKGROUND

In current document files, it is known that many documents with similar or even identical words exist. Thus, with the commonality of words and phrases in different documents or even different versions of the documents, it is time consuming to find an exact document quickly and efficiently. Often, a keyword search could produce a list of many documents with the same word and even include all the various versions of the different documents containing the keyword. This is especially problematic if the keyword used in the search is a common word for a particular application. Additionally, documents may include patterns in their pages that a user would like to use as a search criteria. Thus, there is a need to combine keyword(s) and pattern(s) in searching for documents.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides establishing a pattern search box for searching one or more documents in a database. Accordingly, a method for searching a database for one or more documents with at least one pattern element, the method including dividing a pattern search box into a plurality of sections; inputting the at least one pattern element to one or more of the plurality of sections of the pattern search box; and searching the database for the one or more documents with the at least one pattern element to the one or more of the plurality of sections of the pattern search box to produce a search result.

In one example, the method further includes displaying the search result in a result display with at least one display type. In one example, the method further includes inputting a first keyword in a keywords-in-document search box prior to searching the database; inputting a second keyword in a keywords-on-page search box prior to searching the database; and wherein the searching the database uses the at least one pattern element, the first keyword and the second keyword.

In one example, the result display comprises more than two display types. In one example, one of the more than two display types presents all documents that include the first keyword, the second keyword and a prescribed characteristic defined in the pattern search box. In one example, one of the more than two display types presents all documents that include the first keyword and a prescribed characteristic defined in the pattern search box. In one example, one of the more than two display types presents all documents that include the second keyword and a prescribed characteristic defined in the pattern search box. In one example, one of the more than two display types presents all documents that include a prescribed characteristic defined in the pattern search box.

In one example, the method further includes inputting a first keyword in a keywords-in-document search box prior to searching the database; inputting a second keyword in a keywords-on-page search box prior to searching the database; and wherein the searching the database uses the at least one pattern element, the first keyword and the second keyword.

In one example, the method further includes inputting at least one keyword in a keywords-in-document search box prior to searching the database; and wherein the searching the database uses the at least one pattern element and the at least one keyword inputted in the keywords-in-document search box.

In one example, the method further includes inputting at least one keyword in a keywords-on-page search box prior to searching the database; and wherein the searching the database uses the at least one pattern element and the at least one keyword inputted in the keywords-on-page search box.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The present disclosure relates to establishing a pattern search box for searching one or more documents in a database. In one example, the database includes a plurality of documents, wherein each of the documents may include one or more pages. An object of the search is to find one or more documents with one or more pages that resembles a search page.

Figure 1:
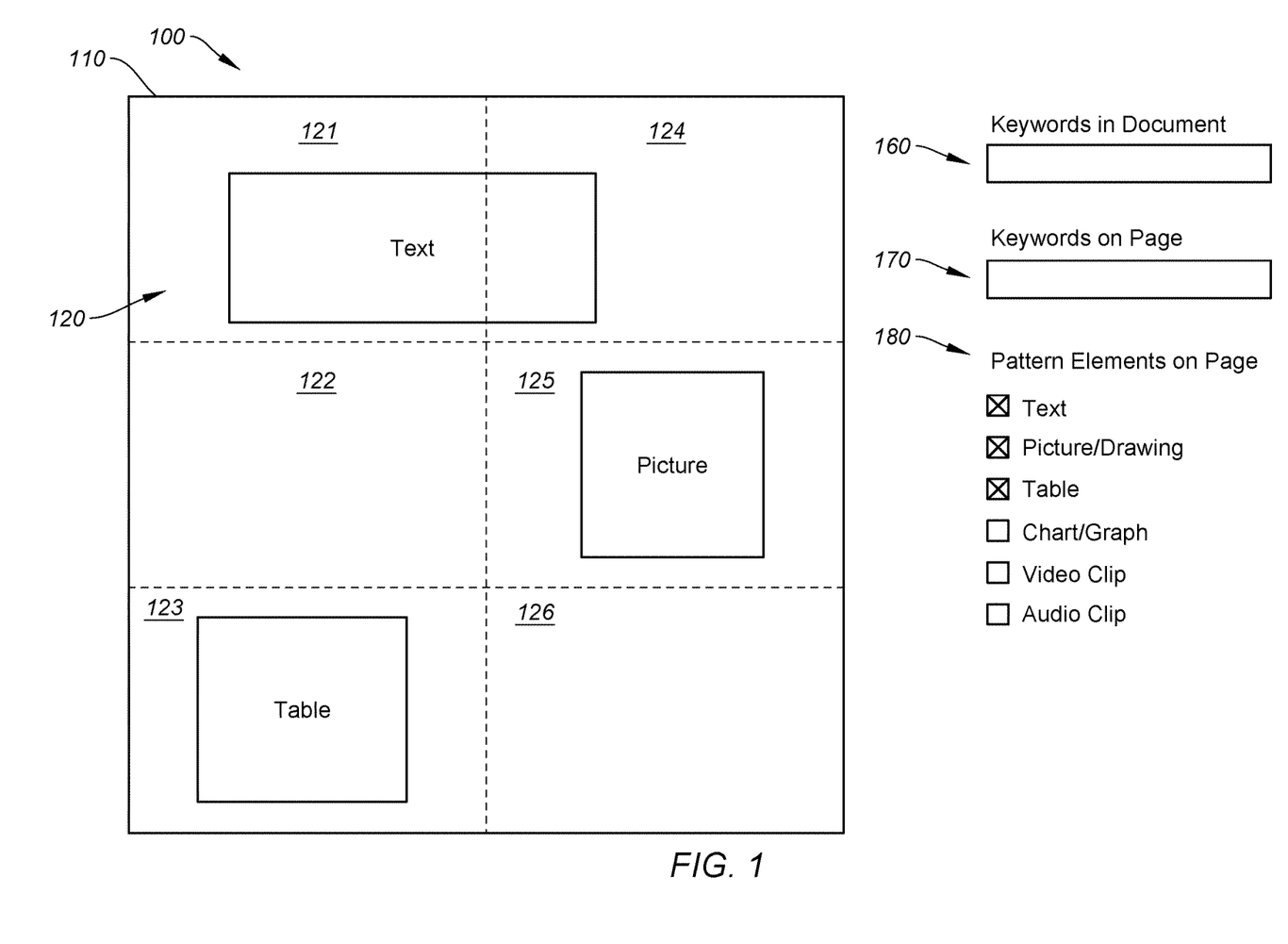
FIG. 1 illustrates an example of a pattern search page.

In one aspect, the searcher establishes a pattern search box by choosing one or more pattern elements that identify the search page. FIG. 1 illustrates an example of a pattern search page 100. In the pattern search page, the following are included:

a pattern search box 110,
a keywords-in-document search box 160,
a keywords-on-page search box 170, and
a list of pattern elements 180.

In one example, the pattern search box 110 is divided into a plurality of sections 120. As an example, the pattern search box 110 is shown to be divided into six (6) sections 121, 122, 123, 124, 125, 126. Each of the sections can be populated by one or more pattern elements 180. Examples of pattern elements 180 include text, pictures/drawings (which may include photos), tables, charts/graphs, video clips and/or audio clips.

One skilled in the art would understand that the list of pattern elements shown in FIG. 1 is not exclusive, and the list may include other pattern elements not explicitly listed herein. Also, in another example, the pattern elements listed in FIG. 1 may not all be included. One skilled in the art would understand that although six sections are shown in FIG. 1, the quantity of sections may vary within the spirit and scope of the present disclosure.

In one example, a user populates one or more sections with one or more pattern elements 180. In the example shown, the pattern search box 110 is populated with three pattern elements: text, picture and table. As shown in FIG. 1, the pattern element "Text" populates sections 121 and 124, the pattern element "Picture" populates section 125, and the pattern element "Table" populates section 123. In one example, a document with one or more pages that includes the pattern elements in the populated sections will be included in the search result even if none of the keywords in the keywords-in-document search box 160 is found. In another example, a document with one or more pages that includes the pattern elements in the populated sections will be included in the search result even if none of the keywords in the keywords-on-page search box 170.

In yet another example, a document with one or more pages that includes the pattern elements in the populated sections will be included in the search result only if the keyword (s) in the keywords-in-document search box 160 and/or the keyword(s) in the keywords-on-page search box 170 is found. In one example, a user has the option of choosing if the keywords-in-document search box 160 or the keyword(s) in the keywords-on-page search box 170 are optional or required for a document to be included in the search result.

In one example, one or more keywords may be entered in the keywords-in-document search box 160. If one or more keywords are entered in the keywords-in-document search box 160, then any search result of documents would include only documents in the database that have the one or more keywords entered in the keywords-in-document search box 160. In one example, entering one or more keywords in the keywords-in-document search box 160 is optional.

In one example, one or more keywords may be entered in the keywords-on-page search box 170. If one or more keywords are entered in the keywords-on-page search box 170, then any search result of documents would include only documents in the database that have the one or more keywords entered in the keywords-on-page search box 170 that appears on a page that has the prescribed characteristics defined in the pattern search box 110. In one example, entering one or more keywords in the keywords-on-page search box 170 is optional.

In one example, if no keyword is entered in both the keywords-in-document search box 160 or the keywords-on-page search box 170, then the search is confined to finding documents with one or more pages that have the characteristics of the pattern search box 110.

The term "keyword" for inputting in the keywords-in-document search box 160 may include terms for searching that are found in the metadata. That is, in one example, a keyword that is entered into the keywords-in-document search box 160 is searched in not only the content of the documents in the database, but also the metadata associated with the documents in the database being searched. Metadata may include the title and other information associated with the documents.

Figure 2:
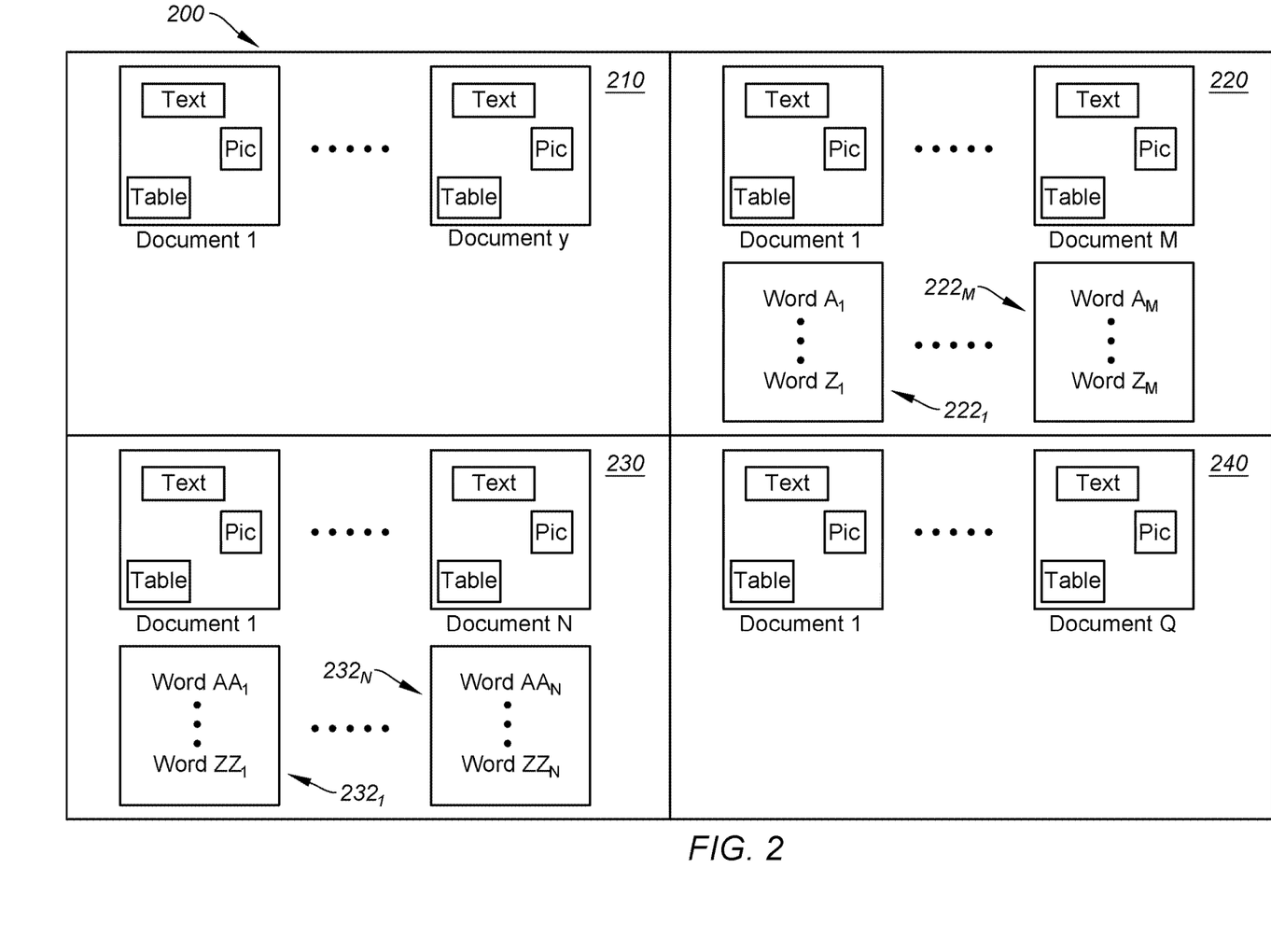
FIG. 2 illustrates an example result display of a search using the pattern search box.

FIG. 2 illustrates an example result display 200 of a search using the pattern search box. In one example, the result display includes four display types 210, 220, 230, 240. In display type 210, presented are all documents that satisfy the keyword requirement of the keywords-in-document search box 160, the keyword requirement of the keywords-on-page search box 170 and the prescribed characteristics defined in the pattern search box 110. That is, all the documents presented in display type 210 includes the one or more keywords entered in the keywords-in-document search box 160, and includes the one or more keywords entered in the keywords-on-page search box 170. In addition, all the documents presented in the display type 210 include one or more pages with the prescribed characteristics defined in the pattern search box 110. For example, if the prescribed characteristics is the example shown in the pattern search box 110 of FIG. 1, then all the documents in display type 210 must include one or more pages with text appearing in sections 121 and 124, a picture in section 125 and a table in section 123.

In one example, the documents in the result display 200 are presented in common image format (CIF). In one example, the CIF representation of each document in the result display 200 shows one of the pages that satisfies the prescribed characteristics defined in the pattern search box 110. In one example, the documents in the result display 200 are presented in scaled original document format (e.g., WORD, Excel, Power Point, PDF, Web page, drawing, etc.). In one example, a page of the document that satisfies the criteria of the display type (e.g., display type 210, 220, 230, 240) is the page that is displayed as a representation of the document found in the search. In one example, the first page of the document that satisfies the criteria of a display type is shown as a representative of the document in the display type.

FIG. 2 shows that there are X quantity of documents that are displayed in display type 210. One skilled in the art would understand that the quantity X can be 1 document or multiple documents.

In display type 220, presented are all documents that satisfy the keyword requirement of the keywords-on-page search box 170 and the prescribed characteristics defined in the pattern search box 110. However, the documents presented in display type 220 do not satisfy all the keyword requirement of the keywords-in-document search box 160. Word Box 222 lists the keyword(s) entered into the keywords-in-document search box 160 that is not found in each of the documents presented in display type 220. In one example, since there are M quantity of documents in the display type 220, Word Box 222 is divided into M partitions with partition $222_1$ corresponding to document 1 and partition $222_M$ corresponding to document M of display type 220. In one example, the user may chose to display only the Word Box 222 in display type 220.

That is, each of the documents presented in display type 220 includes the one or more keywords entered in the keywords-on-page search box 170 and may or may not include the keyword(s) entered in the keywords-in-document search box 160. In addition, all the documents presented in the display type 220 include one or more pages with the prescribed characteristics defined in the pattern search box 110. For example, if the prescribed characteristics are the example shown in the pattern search box 110 of FIG. 1, then all the documents in display type 220 must include one or more pages with text appearing in sections 121 and 124, a picture in section 125 and a table in section 123.

In one example, the display type 220, "Word $A_1$" through "Word $Z_1$" represent the keywords entered in keywords-in-document search box 160 that do not appear in Document 1 of display type 220. In display type 220, "Word $A_M$" through "Word $Z_M$" represent the keywords entered in keywords-in-document search box 160 that do not appear in Document M of display type 220. Each document from Document 1 through Document M includes a corresponding Word Box. In yet another example, each Word Box that correspond to one document of the Document 1 through Document M may include multiple pages, wherein each of the multiple pages correspond to a page of the one document. For example, Document 1 includes 5 pages, then the Word Box $222_1$ would include 5 pages with each page of the Word Box $222_1$ corresponding to each page of Document 1. Thus, in this example, page 3 of Word Box $222_1$ would the keywords-in-document search box 160 that do not appear on page 3 of Document 1.

In another example, the display type 220, "Word $A_1$" through "Word $Z_1$" represent the keywords entered in keywords-in-document search box 160 that do appear in Document 1 of display type 220. In display type 220, "Word $A_M$" through "Word $Z_M$" represent the keywords entered in keywords-in-document search box 160 that do appear in Document M of display type 220. Each document from Document 1 through Document M includes a corresponding Word Box. In yet another example, each Word Box that correspond to one document of the Document 1 through Document M may include multiple pages, wherein each of the multiple pages correspond to a page of the one document. For example, Document 1 includes 5 pages, then the Word Box $222_1$ would include 5 pages with each page of the Word Box $222_1$ corresponding to each page of Document 1. Thus, in this example, page 3 of Word Box $222_1$ would the keywords-in-document search box 160 that do appear on page 3 of Document 1.

FIG. 2 shows that there are M quantity of documents that are displayed in display type 220.

However, one skilled in the art would understand that the quantity M can be 1 document or multiple documents.

In display type 230, presented are all documents that satisfy the keyword requirement of the keywords-in-document search box 160 and the prescribed characteristics defined in the pattern search box 110. However, the documents presented in display type 230 do not satisfy all the keyword requirement of the keywords-on-page search box 170. Word Box 232 lists the keyword(s) entered into the keywords-on-page search box 170 that is not found in each of the documents presented in display type 230. In one example, since there are N quantity of documents in the display type 230, Word Box 232 is divided into N partitions with partition $232_1$ corresponding to document 1 and partition $232_N$ corresponding to document N of display type 230.

That is, each of the documents presented in display type 230 includes the one or more keywords entered in the keywords-in-document search box 160 and may or may not include the keyword(s) entered in the keywords-on-page search box 170. In addition, all the documents presented in the display type 230 include one or more pages with the prescribed characteristics defined in the pattern search box 110. For example, if the prescribed characteristics is the example shown in the pattern search box 110 of FIG. 1, then all the documents in display type 230 must include one or more pages with text appearing in sections 121 and 124, a picture in section 125 and a table in section 123.

In one example, the display type 230, "Word $AA_1$" through "Word $ZZ_1$" represent the keywords entered in keywords-on-page search box 170 that do not appear in Document 1 of display type 230. In display type 230, "Word $AA_N$" through "Word $ZZ_N$" represent the keywords entered in keywords-on-page search box 170 that do not appear in Document N of display type 230. Each document from Document 1 through Document M includes a corresponding Word Box. In yet another example, each Word Box that correspond to one document of the Document 1 through Document M may include multiple pages, wherein each of the multiple pages correspond to a page of the one document. For example, Document 1 includes 5 pages, then the Word Box $222_1$ would include 5 pages with each page of the Word Box $222_1$ corresponding to each page of Document 1. Thus, in this example, page 3 of Word Box $222_1$ would the keywords-on-page search box 170 that do not appear on page 3 of Document 1.

In another example, the display type 230, "Word $AA_1$" through "Word $ZZ_1$" represent the keywords entered in keywords-on-page search box 170 that do appear in Document 1 of display type 230. In display type 230, "Word $AA_N$" through "Word $ZZ_N$" represent the keywords entered in keywords-on-page search box 170 that do appear in Document N of display type 230. Each document from Document 1 through Document M includes a corresponding Word Box. In yet another example, each Word Box that correspond to one document of the Document 1 through Document M may include multiple pages, wherein each of the multiple pages correspond to a page of the one document. For example, Document 1 includes 5 pages, then the Word Box 222$_1$ would include 5 pages with each page of the Word Box 222$_1$ corresponding to each page of Document 1. Thus, in this example, page 3 of Document 1.

FIG. 2 shows that there are N quantity of documents that are displayed in display type 230.

However, one skilled in the art would understand that the quantity N can be 1 document or multiple documents.

In display type 240, presented are all documents that satisfy the prescribed characteristics defined in the pattern search box 110, but do not satisfy the keyword requirement of the keywords-in-document search box 160 and the keyword requirement of the keywords-on-page search box 170.

That is, all the documents presented in display type 240 do not include any of the keywords entered in the keywords-in-document search box 160, and do not include any of the keywords entered in the keywords-on-page search box 170. But, all the documents presented in the display type 240 include one or more pages with the prescribed characteristics defined in the pattern search box 110. For example, if the prescribed characteristics is the example shown in the pattern search box 110 of FIG. 1, then all the documents in display type 240 must include one or more pages with text appearing in sections 121 and 124, a picture in section 125 and a table in section 123.

FIG. 2 shows that there are Q quantity of documents that are displayed in display type 240. However, one skilled in the art would understand that the quantity Q can be 1 document or multiple documents.

In one example, some (but not all) of the keywords entered in the keywords-in-document search box 160, and some (but not all) of the keywords entered in the keywords-on-page search box 170 are found in the documents presented in a display result. In this example, the display type may include two Word Boxes to correspond to each document displayed in the display type. A first Word Box for a particular document presents the word(s) of the keywords-in-document search box 160 not found in the particular document while a second Word Box for the particular document presents the word(s) of the keywords-on-page search box 170 not found in the pages of the particular document.

In an alternative example, the display type may include two Word Boxes to correspond to each document displayed in the display type with a first Word Box for a particular document presents the word(s) of the keywords-in-document search box 160 found in the particular document and a second Word Box for the particular document presents the word(s) of the keywords-on-page search box 170 found in the pages of the particular document. In one example, the second Word Box may include multiple pages to correspondent to the quantity of pages of the particular document.

In one example, each of the four display types 210, 220, 230, 240 of the result display shown in FIG. 2 is associated with an enabling/disabling option whereby the display type may be disabled so that it is not displayed. For example if display types 220 and 230 are disabled and display types 210 and 240 are enabled, then the result display 200 would only show display types 210 and 240.

In the example of FIG. 2, presentation (i.e., displaying) the Word Boxes is optional. In the example of FIG. 2, one or more pattern element may be specified without the specification of a section in the pattern search box. That is, the pattern element(s) that is specified without an associated section need only appear in a page of a document for the document to be presented in the search result.

In one example, the matching of a page in a document to the prescribed characteristics defined in the pattern search box 110 need not be exact. That is, partial matching may be defined by the user. For example, a user may have the option to define that a particular pattern element in a plurality of pattern elements in the pattern search box 110 may be optional for a particular section or sections.

In one example, the presentation of documents in the display type may be subject to a presentation order. The presentation order may be predefined or may be defined by a user prior to the start of each search session. An example of a presentation order may be that a document with the most exact matching of the prescribed characteristics defined in the pattern search box 110 and with the most quantity of keywords-in-document search box 160 and the most quantity of keywords-on-page search box 170 are presented in the result display 200 first or more prominently than another document with less exact matching of the prescribed characteristics defined in the pattern search box 110 and with less quantity of keywords-in-document search box 160 and/or less quantity of keywords-on-page search box 170.

In one example, a presentation order may be weighted based on how 1) closely matched the pages in a document are to the prescribed characteristics defined in the pattern search box 110; 2) how many of the keywords in the keywords-in-document search box 160 are found in the document; and/or 3) how many of the keywords in the keywords-on-page search box 170 are found in the document. In one example, a weighting function may apply to the above three requirements to determine the presentation order.

In one example, if a document has a first page that meets the criteria of being displayed in display type 210, a second page that meets the criteria of being displayed in display type 220, a third page that meets the criteria of being displayed in display type 230 and/or a fourth page that meets the criteria of being displayed in display type 240, that document may only appear in one of the four display types. In one example, the display type that meets the most criteria for searching is where the document will be presented. In another example, a user may choose the display type for the document.

In one example, the display of a document will include all pages of the document that meet the search criteria for the display type that the document will be displayed in.

In one example, the display of a document will include all pages of the document that meet the search criteria for all display types even though the document is being displayed in the window of one display type. As an example for illustration only, if a document includes a first page that meets the criteria for displaying in display type 210, a second page that meets the criteria for displaying in display type 220 and a third page that meets the criteria for displaying in display type 230, the document may be displayed in display type 210 showing the first, the second and the third page. One skilled in the art would understand that other examples for displaying when different pages of a document meets the different criteria of the different display types are also within the scope and spirit of the present disclosure.

Figure 3:
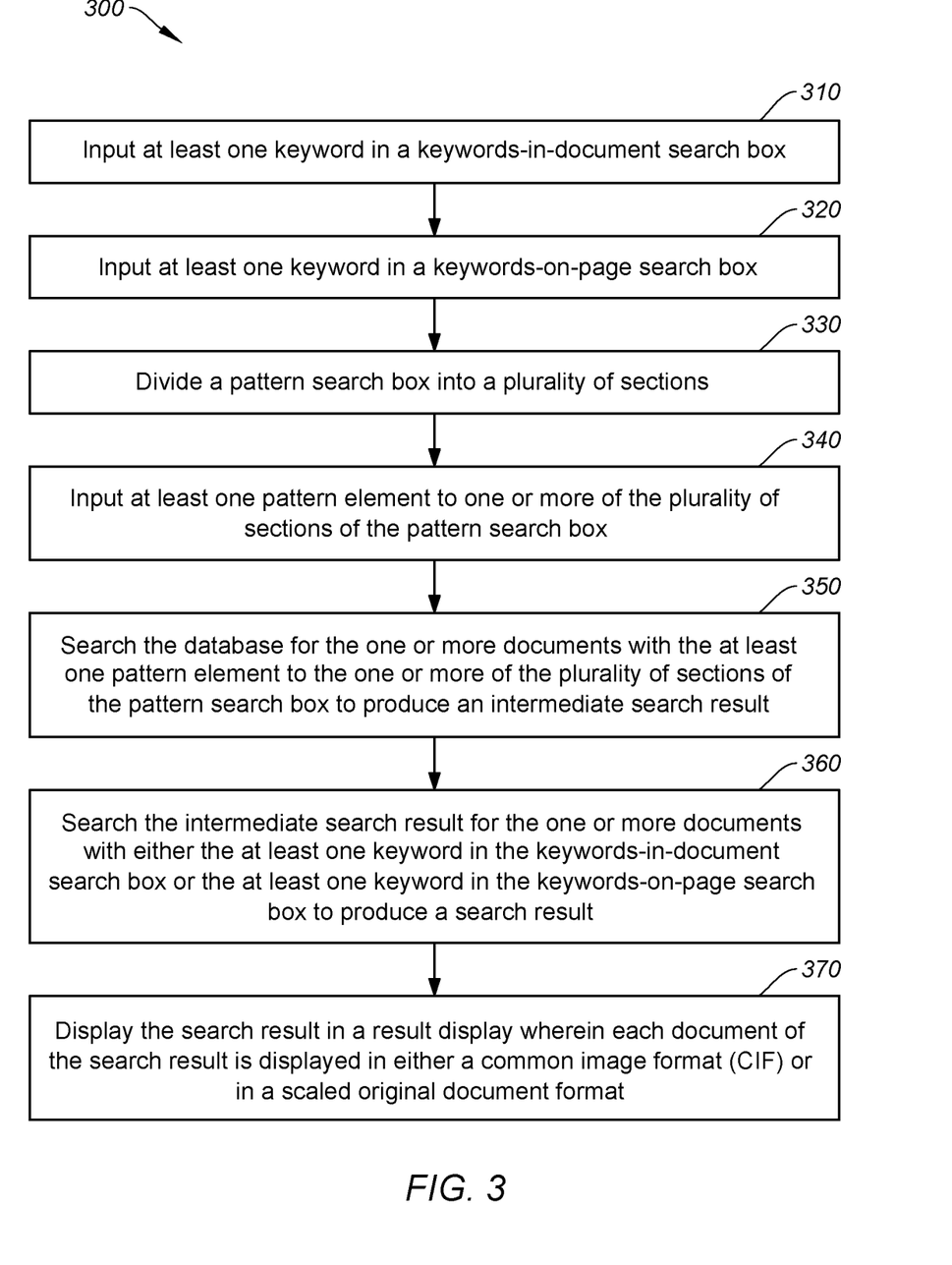
FIG. 3 illustrates an example of a flow diagram for searching a database for one or more documents with one or more pattern elements and displaying a search result on a result display.

FIG. 3 illustrates an example of a flow diagram 300 for searching a database for one or more documents with one or more pattern elements and displaying a search result on a result display.

In box 310, input at least one keyword in a keywords-in-document search box. In one example, the at least one keyword must appear in a document for the document to be included in a search result.

In box 320, input at least one keyword in a keywords-on-page search box. In one example, the at least one keyword must appear in a page of a document for the document to be included in a search result.

In box 330, divide a pattern search box into a plurality of sections. In on example, a user may construct the borders of each of the plurality of sections in the pattern search box. In one example, one of the plurality of sections may have different border shapes and/or a different size (i.e., area foot print) to another of the plurality of sections.

In box 340, input at least one pattern element to one or more of the plurality of sections of the pattern search box.

In box 350, search the database for the one or more documents with the at least one pattern element to the one or more of the plurality of sections of the pattern search box to produce an intermediate search result. In one example, the intermediate search result includes all documents in the database that include at least one page with the at least one pattern element located on the one or more of the plurality of sections of the pattern search box.

In box 360, search the intermediate search result for the one or more documents with either the at least one keyword in the keywords-in-document search box or the at least one keyword in the keywords-on-page search box to produce a search result. In one example, the search result includes only documents in the intermediate search result that includes either at least one keyword in the document that has been entered in the keywords-in-document search box and/or at least one keyword in a page of the document that has been entered in the keywords-on-page search box.

In box 370, display the search result in a result display wherein each document of the search result is displayed in either a common image format (CIF) or in a scaled original document format. In one example, the result display includes one or more of the display types 210, 220, 230, 240 as disclosed in FIG. 2.

In one aspect, one or more of the steps for searching documents with one or more pattern elements and displaying a search result on a result display in FIG. 3 may be executed by one or more processors which may include hardware, software, firmware, etc. In one aspect, one or more of the steps illustrated in FIG. 3 may be executed by one or more processors which may include hardware, software, firmware, etc. The one or more processors, for example, may be used to execute software or firmware needed to perform the steps in the flow diagram of FIG. 3. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for searching documents with one or more pattern elements and displaying a search result on a result display. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for searching a database for one or more documents with at least one pattern element, the method comprising:
    dividing a pattern search box into a plurality of sections;
    inputting the at least one pattern element to one or more of the plurality of sections of the pattern search box, wherein the pattern search box prescribes a characteristic of a page of the one or more documents based on the plurality of sections;
    inputting a first keyword in the keywords-in-document search box prior to searching the database;
    inputting a second keyword in a keywords-on-page search box prior to searching the database, wherein the searching the database uses the pattern element, the first keyword and the second keyword;
    searching the database for the one or more documents with the at least one pattern element to the one or more of the plurality of sections of the pattern search box to produce a search result; and
    presenting the search results in at least one of four display types, wherein a first display type presents all documents that satisfy a keyword requirement of a keywords-in-document search box.

2. The method of claim 1, further comprising a second display type, wherein the second display type presents all documents that satisfy the keyword requirement of a keywords-on-a page search box.

3. The method of claim 2, further comprising:
    inputting a first keyword in the keywords-in-document search box prior to searching the database;
    inputting a second keyword in the keywords-on-page search box prior to searching the database; and
    wherein the searching the database uses the pattern element, the first keyword and the second keyword.

4. The method of claim 3, wherein the result display comprises more than two display types.

5. The method of claim 4, wherein one of the more than two display types presents all documents that include the first keyword, the second keyword and a prescribed characteristic defined in the pattern search box.

6. The method of claim 4, wherein one of the more than two display types presents all documents that include the first keyword and a prescribed characteristic defined in the pattern search box.

7. The method of claim 4, wherein one of the more than two display types presents all documents that include the second keyword and a prescribed characteristic defined in the pattern search box.

8. The method of claim 4, wherein one of the more than two display types presents all documents that include a prescribed characteristic defined in the pattern search box.

9. The method of claim 1, further comprising:
    inputting at least one keyword in the keywords-in-document search box prior to searching the database; and
    wherein the searching the database uses the pattern element and the at least one keyword inputted in the keywords-in-document search box.

10. The method of claim 1, further comprising:
    inputting at least one keyword in a keywords-on-page search box prior to searching the database; and
    wherein the searching the database uses the pattern element and the at least one keyword inputted in the keywords-on-page search box.

* * * * *